United States Patent Office
3,580,901
Patented May 25, 1971

3,580,901
MAROON DISAZO DYES FOR POLYAMIDE FIBERS
James F. Feeman, Wyomissing, Pa., assignor to Crompton & Knowles Corporation, Worcester, Mass.
No Drawing. Filed Nov. 14, 1968, Ser. No. 775,950
Int. Cl. C09b 31/04; D06p 1/02
U.S. Cl. 260—191                                6 Claims

ABSTRACT OF THE DISCLOSURE

Compounds that are useful as neutral dyeing dyes for polyamide fibers and dye such fibers in level, lightfast maroon shades.

The dyes have the structure:

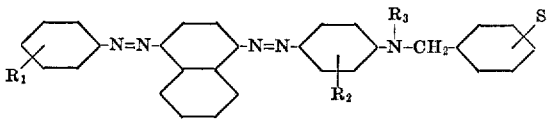

wherein $R_1$ represents —H, —$CH_3$, —$OCH_3$ or —Cl; $R_2$ represents —H or —$CH_3$; $R_3$ represents lower alkyl having 1 to 4 C atoms and M represents —H, —Na, —K or —$NH_4$.

---

This invention relates to a new group of organic compounds that are useful as dyes for natural and synthetic polyamide fibers.

The new compounds have the structure:

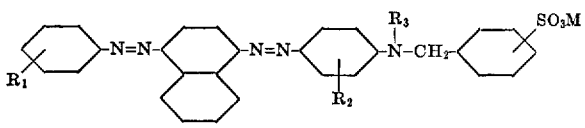

wherein $R_1$ represents —H, —$CH_3$, —$OCH_3$ or —Cl, $R_2$ represents —H or —$CH_3$, $R_3$ represents lower alkyl having 1 to 4 C atoms and M represents —H, —Na, —K, or —$NH_4$.

The new compounds are obtained by diazotizing and coupling aniline, a toluidine, an anisidine or a chloroaniline to alpha-naphthylamine, rediazotizing the reaction product and coupling the resultant diazonium salt to a sulfobenzyl-alkyl-aniline or a sulfobenzyl-alkyl-o- or m-toluidine.

The sulfobenzyl - alkyl - anilines may be prepared by reaction of an N-alkyl aniline such as N-methylaniline, N - ethylaniline, N - n - propylaniline, N - iso - propylaniline, N - n - butylaniline, N - sec - butylaniline, N-isobutylaniline or N-tert-butylaniline with benzyl chloride to form the corresponding tertiary amines, followed by sulfonation in 100% sulfuric acid by addition of 60% oleum in equimolar amounts. A satisfactory method for preparation of N-ethylbenzylaniline sulfonic acids is given in the book "Fundamental Process of Dye Chemistry," H. E. Fierz-David and L. Blangley, translated from the Fifth Austrian Edition by P. W. Vittum, pp. 134–137, Interscience Publishers, Inc. New York (1949).

The method of sulfonation was also used in the preparation of homologous compounds; however, the sulfonated products were not usually isolated, but neutralized and used as the crude mixtures of sulfonic acid isomers.

In analogous manner, various N-alkyl derivatives of ortho-toluidine and meta-toluidine such as the N-methyl, N-ethyl, N-propyl and N-butyl compounds including the various isomers of the propyl and butyl toluidines may be benzylated, sulfonated and used as the final coupling component to give desirable maroon dyes.

The compounds prepared in accordance with this invention have unique and highly valuable properties when used as dyes. They will dye polyamide fibers such as nylon, silk and wool in light-fast maroon shades having very good wet fastness. They are particularly useful in dyeing bulked continuous filament (BCF) nylon carpet fibers from neutral or alkaline baths with a high degree of exhaustion. The resultant dyeings are characterized by excellent levelness and freedom from warp streaks.

Commercial dyes presently available for dyeing polyamide fibers in deep maroon shades, such as the dye of the formula:

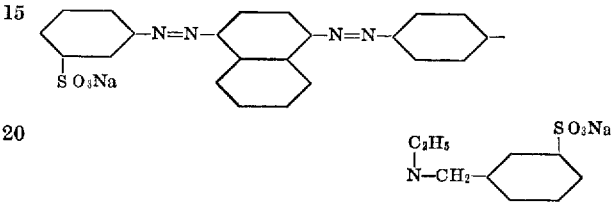

do not exhaust well onto nylon fibers from neutral to alkaline baths and do not cover imperfections in nylon fabrics well, but tend to accentuate them. The lack of neutral dyeing capabilities makes it inadvisable to use this dye on jute backed nylon carpeting. Since this dye must be applied from acid baths, the brown color of the jute backing will transfer to and stain the nylon. Such jute stains will flatten the shade and will adversely influence lightfastness characteristics.

The dyes of this invention have surprisingly good solubility in water, despite their relatively high molecular weight and the presence of only one sulfonic acid group in the molecule. This property makes these dyes useful in the dyeing equipment currently available in the trade.

The following examples will serve to illustrate how the compounds of this invention may be prepared and used. In these examples, unless otherwise indicated, parts are by weight, temperatures are in degrees centigrade and percentages are by weight.

EXAMPLE 1

Aniline (9.4 parts) was dissolved in 100 parts of water by means of 28 parts of concentrated hydrochloric acid. Ice was added to lower the temperature to 0° and a solution of 7 parts of sodium nitrite in 20 parts of water was added. A solution of 14.3 parts of 1-naphthyl-amine in 300 parts of water and 15 parts of concentrated hydrochloric acid at 80° was then run into the diazo solution and cracked ice added simultaneously to keep the temperature at 0°.

A solution of 14 parts of sodium hydroxide in 60 parts of water was added during 30 minutes raising the pH to 3.5, and then to 9.5 during the next 30 minutes. Then a 30% solution in water of 7.7 parts of sodium nitrite was added, followed rapidly by 55 parts of concentrated hydrochloric acid.

The mixture was stirred for four hours at 10°–15° with excess nitrous acid present, providing a solution of the diazonium salt. A slight excess of nitrous acid was decomposed by addition of sulfamic acid and a small amount of insoluble matter removed by filtration.

This diazo solution was then run into a solution of 32 parts of m-sulfobenzyl-N-ethyl-aniline in 200 parts of water neutralized with 12 parts of sodium carbonate and containing 25 parts of sodium acetate at 0°. The product crystallized out. After stirring overnight the pH was raised to 7.8 with 24 parts of sodium carbonate and the product filtered and dried. It was a dark-red colored solid, which dissolved readily in water and dyed nylon, silk and wool from neutral to alkaline baths in maroon shades having excellent fastness to light and good washing fastness. This dye has the structure:

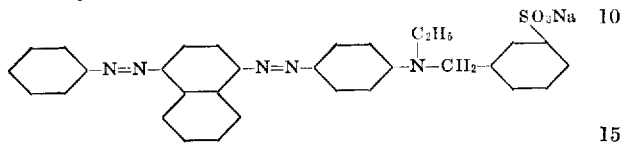

EXAMPLE 2

A dyebath was prepared using 0.15 part of trisodium phosphate and 0.20 part of the dye of Example 1 in 300 parts of water. A piece of nylon carpeting (10 parts) which consisted of BCF (bulked continuous filament) nylon (a product of E. I. du Pont de Nemours and Co., Inc.) as the face with a jute backing, the nylon being present as about 55% of the total fabric weight, was placed in the bath at 100° F. and the temperature raised during 30 minutes to 205° F. The fabric was moved in the dyebath for one hour longer at this temperature and then rinsed and dried. At the beginning the pH of the bath was 10.0 while at the end it had dropped to 8. The carpet facing was dyed a deep, level maroon shade which had excellent fastness to light and to wet treatments.

Dyes having similar properties to those of Example 1 were also prepared using the intermediates listed in the following Table I by diazotizing the first component listed and coupling to alpha-naphthylamine, rediazotizing the monoazo intermediate and coupling to the third component listed.

TABLE I

| Example number | First component | Third component | Shade of dyeing on nylon |
|---|---|---|---|
| 3 | o-Toluidine | meta-Sulfobenzyl-N-ethylaniline | Maroon. |
| 4 | m-Toluidine | do | Do. |
| 5 | p-Toluidine | do | Do. |
| 6 | o-Anisidine | do | Do. |
| 7 | p-Anisidine | do | Do. |
| 8 | Aniline | Sulfobenzyl-N-ethyl-m-toluidine | Bluish-maroon. |
| 9 | m-Toluidine | do | Maroon. |
| 10 | Aniline | Sulfobenzyl-N-methylaniline | Do. |
| 11 | m-Toluidine | do | Do. |
| 12 | p-Toluidine | do | Do. |
| 13 | o-Chloroaniline | meta-Sulfobenzyl-N-ethylaniline | Bluish-maroon. |
| 14 | m-Chloroaniline | do | Do. |
| 15 | p-Chloroaniline | do | Do. |

Dyes that have the structure:

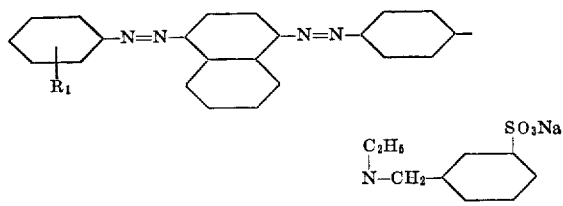

wherein $R_1$ is —H or —CH$_3$ are as a group preferred structures since in addition to the unique features characterizing compounds of this invention, they exhibit very high level lightfastness, the shade of color is a desirable yellowish-maroon, and they can be made from commercially available intermediates with attendant economic benefits.

I claim:
1. A composition having the structure:

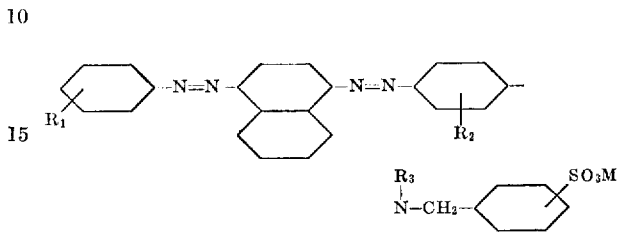

wherein $R_1$ represents —H, —CH$_3$, —OCH$_3$ or —Cl; $R_2$ represents —H or CH$_3$; $R_3$ represents a lower alkyl radical having from 1 to 4 carbon atoms, and M represents —H, —Na, —K or —NH$_4$.

2. A compound according to claim 1 wherein $R_1$ is —H or —CH$_3$; $R_2$ is —H; $R_3$ is —C$_2$H$_5$ and M is —Na; the —SO$_3$Na group is positioned meta to the —CH$_2$ group.

3. A compound according to claim 2 wherein $R_1$ is —H.

4. A compound according to claim 2 wherein $R_1$ is —CH$_3$ and is positioned ortho to the azo group.

5. A compound according to claim 2 wherein $R_1$ is —CH$_3$ and is position meta to the azo group.

6. A compound according to claim 2 wherein $R_1$ is —CH$_3$ and is positioned para to the azo group.

References Cited
UNITED STATES PATENTS 3,267,089  8/1966  Feeman _____ 260—191

CHARLES B. PARKER, Primary Examiner

D. M. PAPUGA, Assistant Examiner

U.S. Cl. X.R.

260—196; 8—54,178